Nov. 14, 1961  J. D. SPRIGGS  3,008,779
NYLON LINED BEARINGS
Filed June 3, 1959  2 Sheets-Sheet 1
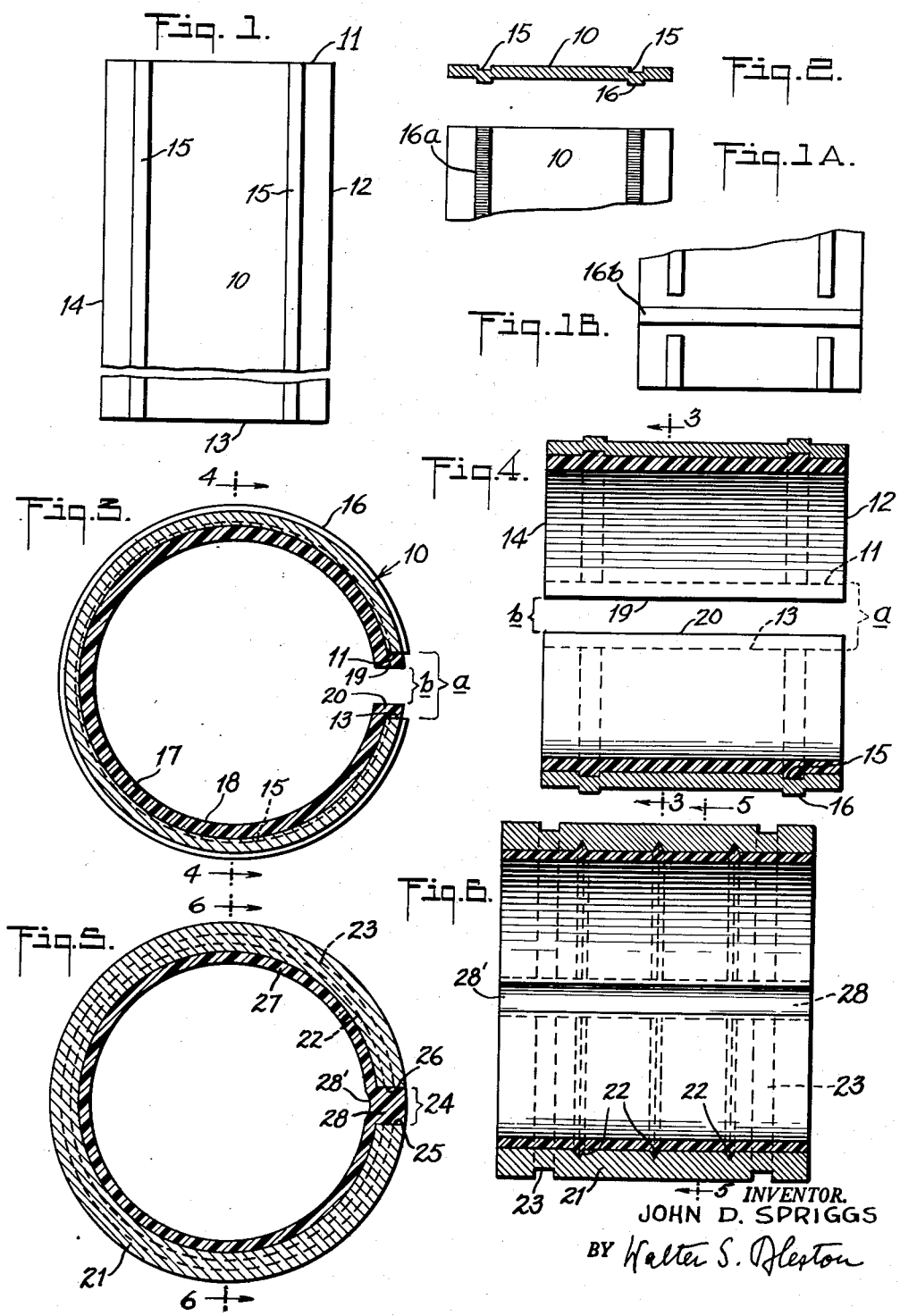
INVENTOR.
JOHN D. SPRIGGS
BY Walter S. Aleston
ATTORNEY Nov. 14, 1961   J. D. SPRIGGS   3,008,779
NYLON LINED BEARINGS
Filed June 3, 1959   2 Sheets-Sheet 2
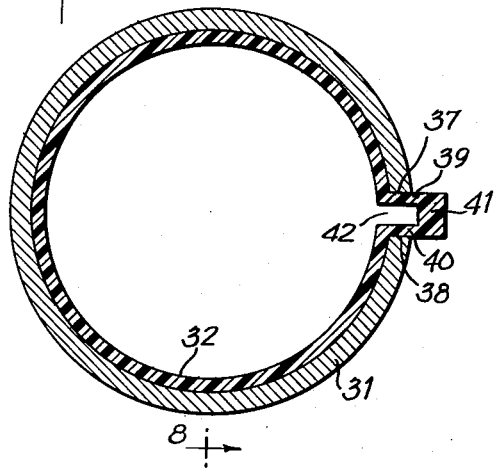
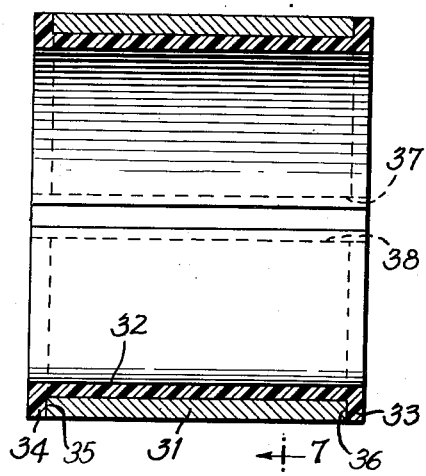
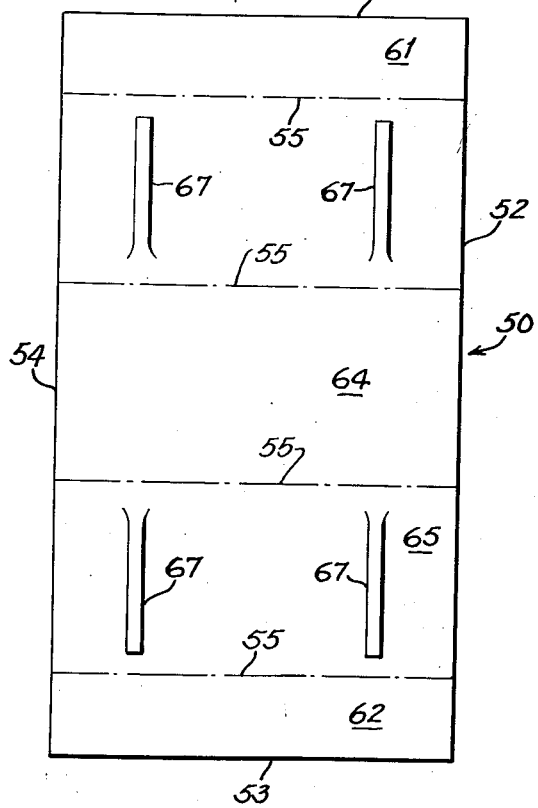
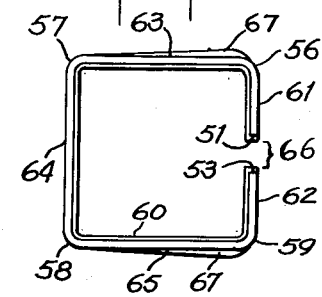
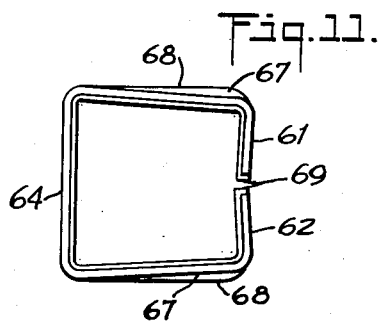
INVENTOR.
JOHN D. SPRIGGS
BY Walter S. Pleston
ATTORNEY

3,008,779
NYLON LINED BEARINGS
John D. Spriggs, Floral Park, N.Y.
(12 Valentine Ave., Glen Cove, N.Y.)
Filed June 3, 1959, Ser. No. 817,775
2 Claims. (Cl. 308—238)

The invention relates to a bearing comprising a shell with a lining of nylon or similar synthetic resin material having a relatively high melting point and at least some self-lubricating properties.

Bearings of the mentioned type constitute marketable units. However, the conventional bearings frequently have the drawback that they are not uniform as to their roundness and outer diameter so that they do not properly fit the housings for which they are destined, or the bores of the housings for receiving the bearings are not exact as to size and roundness. In other instances, the bearings are expensive if made to ensure a required proper fit, i.e. to ensure the maintenance of desired tolerances which, in turn, requires that the housing also must be accurately machined by expensive operations in order to fit the tolerances of the bearing.

The invention aims therefore to overcome this drawback and to provide a relatively inexpensive bearing consisting of a shell with a liner of synthetic resin and satisfactory fit even in certain housings which do not stand high cost operations to maintain or ensure narrow tolerances and precise borings in the bearing-receptive parts.

The invention further aims to cast or mold the synthetic resin into the base or shell thereby ensuring satisfactory accuracy in the thickness and concentricity of the liner wherein means are provided to prevent the liner from shifting with the member, which may be a shaft or arbor moving in the bearing when the latter is in use.

The conventional bearings of the mentioned type frequently have the drawback that owing to the difference in the thermal expansion, elongations of the nylon occur in the one or the other direction in relation to the shell of different material which may result in a malfunctioning of the bearings.

In producing bearings according to my invention, the shell is made of a metallic or non-metallic material which has at least some degree of elasticity. A sheet of a spring steel is preferred for the material of the shell. In producing the shell a rectangular blank will be bent to form a tube, the circumference of which being less than 360 degrees so that a gap is provided between the adjacent edges of the bent blank.

According to the further invention, the nylon or other synthetic resin is cast in a thin layer on the inside of the formed tube so, however, that the liner covers the mentioned adjacent free edges to prevent rotation of the liner in the shell. The gap also allows, in certain forms, clearance for expansion of the liner due to heat or water absorption.

The elastic shell material renders it possible somewhat to contract the formed tube thereby allowing for insertion of the bearing and snapping it into place in a housing for which the bearing is destined.

The invention also contemplates the provision of embossments of the shell material to protrude from the outside and to form grooves on the inside of the shell. Such embossment serves a dual function, first, inasmuch as it may locate the shell in a finished product or housing and, second, in that it contributes to locate the liner into place and to prevent longitudinal and/or circular movements of the latter.

The invention finally contemplates the provision of serrations of the peripheral embossments or of longitudinal embossments in order to prevent rotation of the bearing in the mentioned housing.

Further objects and details of the invention will be apparent from the description given hereinafter and the accompanying drawing illustrating several embodiments thereof by way of example. In the drawing:

FIG. 1 is a top plan view of a blank of a shell for a bearing according to the invention;

FIGS. 1a and 1b are top plan views of portions of two modified blanks;

FIG. 2 is a front view of the blank of FIG. 1;

FIG. 3 is a cross-section along line 3—3 in FIG. 4 of an embodiment of the invention in which a blank as of FIGS. 1 and 2 is used;

FIG. 4 is a cross-section along line 4—4 in FIG. 3;

FIG. 5 is a front elevation of another embodiment;

FIG. 6 is a section along line 6—6 in FIG. 5;

FIG. 7 is a front elevation of still another embodiment;

FIG. 8 is a section along line 8—8 in FIG. 7;

FIG. 9 is a top plan view of a blank for a bearing of square cross-section;

FIG. 10 is a front elevation of a bearing formed from the blank of FIG. 9, and

FIG. 11 is a view similar to FIG. 10 in which the tube has been contracted for insertion in a housing.

Referring now to the drawing, FIGS. 1 and 2 show a blank 10 for a shell stamped of a sheet of suitable material having the desired properties according to the use for which the bearing is destined. In most instances a springy material, such as steel, will be particularly well suited to the purpose. However, other metals may also be useful, and it is even possible to use a non-metallic resin material of a higher melting point than that of the bearing liner, which material should have a certain amount of resiliency. The blank 10, which is of rectangular outline, has the edges 11, 12, 13 and 14. It may be provided with longitudinal grooves or indentations 15 on what will become the inside of the shell and corresponding projections, embossments, or ribs 16 on the ouside. This blank is bent in the shape appearing in FIGS. 3 and 4, i.e. in the form of a tube with a circumference of less than 360 degrees whereby a longitudinal gap $a$ is open in its wall, the gap $a$ being bordered by the edges 11 and 13. In a cross section of the tube, the gap may extend between the radii enclosing a central angle between 10 and 30 degrees. After the blank 10 has been bent as just disclosed, a liner 17 of nylon or similar synthetic resin, as commonly used as bearing liners is molded into it so that the grooves 15 are filled and a substantially smooth inner surface 18 is created except where the grooves are present and where slight indentations may occur owing to the shrinkage of the material when cooling. In addition, the liner 17 covers the edges 11 and 13—although this is not always necessary—thereby projecting with flange-like portions 19 and 20 into the gap $a$ so as to form the narrower gap $b$. Now it will be clear that the nylon material which engages into the grooves 15 will prevent an axial shift of the liner 17 in relation to the shell 10 whereas the flanges 19 and 20 prevent a circumferential shift. Similarly, the ribs 16 will prevent an axial shift of the whole bearing in the housing (not shown) of a finished product into which the bearing may be readily inserted by slightly contracting its diameter and then letting it resiliently snap into place with the ribs 16 into depressions, provided for that purpose, in the housing. It is to be noted that the dimensions of the figures are not according to a definite scale, and that they are exaggerated in order to show more clearly the construction of the bearing.

Now it will be clear that the bearing just described can be readily and inexpensively produced, that it offers, in addition to the foregoing, all the advantages of a conventional nylon-lined bearing and that, moreover, it allows for a free thermal expansion, or expansion due to water absorption, owing to the gap $b$ which may become narrower upon a thermally or otherwise elongated circumferential extension of the liner.

Means may be provided to prevent a circumferential movement of the bearing in the housing into which it may be inserted, the same as an axial movement of the bearing is prevented by the embossments 16. For this purpose, the embossments may e.g. be serrated, as shown at 16a in FIG. 1a, or one or several longitudinal embossments 16b, as in FIG. 1b, may be provided to engage corresponding grooves in the mentioned housing.

At it will be readily understood, it is not necessary that the grooves 15 of the shell register with the embossments 16, and that other kinds of grooves than those shown in in FIG. 4 can be used. It is also possible to provide grooves rather than embossments on the outer surface of the shell to engage interior annular projections, preferably in the form of snap rings, in a housing (not shown) for which the bearing is destined. This is illustrated in FIGS. 5 and 6 where the shell 21, also made of a sheet metal stamping, or by an extruding process, has inside grooves 22 of V-shape and outside grooves 23 of rectangular cross-section. As in the foregoing embodiment, the shell 21 has a circumferential extension of less than 360 degrees so as to form a gap 24 between the edges 25 and 26. The liner 27 of nylon or other lining material is molded into the shell 21. Contrary, however, to the bearing shown in FIGS. 3 and 4, the gap 24 is entirely filled with the nylon or other liner material of the bearing, as clearly visible at 28. The heavy section of nylon 28 locks the liner in position against circumferential shifting, whereas the grooves 22 prevent an axial shift within the shell. The section 28 also serves as an elongated runner of the nylon for molding purposes to render the production of relatively long bearings possible when the nylon liner is very thin, as e.g. less than about .050 in. In sections which are so thin, the nylon cools and freezes rapidly, tending to prevent further material to reach portions of the bearing which are remote from the point where the nylon is fed. A heavy section, such as at 28, will not freeze rapidly and it will carry hot nylon for the entire length of the bearing thereby permitting long bearings to be molded. Hence, whereas the section 28 does not have the same effect in respect to thermal expansion of the nylon, as in the embodiments first described, it is advantageous in the molding operation. However, even some compensation of a thermal expansion can take place owning to the depression 28' which will automatically form when the nylon cools down after being cast.

The embodiments of FIGS. 7 and 8 combine advantages of both the embodiments of the preceding figures. In this case, the shell 31 consists of a plain rectangular sheet of metal bent into tubular form with a circumferential extension of less than 360 degrees. Inside and/or outside grooves or embossments, as in the other embodiments may or may not be provided. The nylon liner 32 is so molded that it forms end flanges 33 and 34 covering the shell edges 35 and 36, respectively, so as to prevent an axial shifting of the liner in relation to the shell 31. In the gap formed by the shell edges 37 and 38, these edges are covered by lengthwise extending nylon flanges 39 and 40 which outside of the shell are connected by a fairly heavy section 41 of the nylon. Thus, the nylon portions 39 to 41 form a channel inside of the gap. The flanges 33 and 34 prevent an axial shift of the liner, whereas the flanges or channel legs 39 and 40 prevent the liner from shifting in a circumferential direction. The free spacing 42 between the flanges 39 and 40 permits to take up thermal expansion of the liner as in the first described embodiment. In addition, the heavy section 41 acts as the section 28 in FIG. 5. It, furthermore, forms a key for engagement with a recess of the housing (not shown) for which the bearing is destined, so as to prevent a rotation of the bearing.

The invention is also applicable to bearings of another rather than a round cross-section, e.g. a square cross-section. Such bearings are applicable to arbors or rods which are lengthwise shiftable. FIG. 9 shows a stamping of which the shell of the bearing in FIGS. 10 and 11 is made. The blank 50 has the edges 51, 52, 53 and 54. The dash and dot lines 55 indicate the location of the bends or corners 56, 57, 58 and 59 as in FIG. 10 which shows the form of the shell into which the liner 60 is molded. Preferably, the corners are not sharp but well rounded, as shown. It will be noticed that the width of the panels 61 and 62 between the edges 51 and 53 and the adjacent lines 55, respectively, is less than half that of one of the panels between two adjacent lines 55, i.e. one of the panels 63, 64 and 65. When the blank is bent, as in FIG. 10, and provided with its liner to be ready for insertion into a housing, the edges 51 and 53 being covered by the nylon flanges 69 leave a gap 66 of similar width and for similar purposes, as described with respect to the gaps in the embodiments illustrated in FIGS. 1 to 8. The gap is also required if the blank and consequently the finished bearing is provided with outwardly directed embossments 67 for the purpose of locating the finished bearing in a housing (not shown) where inner grooves may be provided to receive the embossments therein. It will be noticed that the embossments 67 are wedge-shaped and applied only to the panels 63 and 65, i.e. the panels adjacent the end panels. This is necessary in order to insert the bearing into a square hole of the housing. The insertion becomes possible by squeezing the panels 63 and 65 of the finished bearing of FIG. 10 together, as indicated in FIG. 11 whereby the outer contours 68 of the embossments form substantially rectangles with the panel 64, and the gap between the panels 61 and 62 will be reduced.

It will be understood that, during the molding, liner material will enter the interior of the embossments so that a longitudinal shift of the liner in relation to the shell is prevented. A shift in the circumferential direction is impossible owing to the angular conformation of the bearing. In this respect it is also to be considered that a member reciprocating lengthwise within the bearing does not exercise any circumferential force on the liner. For this reason, it is also unnecessary to let the liner material cover the free edges of the panels 61 and 62, although this has been done in the illustrated embodiment in order to locate the liner more firmly with respect to the panels 61 and 62.

Where, hereinbefore and in the claims, nylon has been mentioned as the liner material, this term should be understood to include any synthetic resin having the qualities hereinabove stated.

Although I have shown and described only a few embodiments of the invention, many modifications and alterations thereof can be made without departure from the essence and spirit of the invention which for that reason shall not be limited but by the scope of the following claims.

I claim:

1. A nylon bearing comprising a thin-walled one piece shell of at least slightly resilient material in the form of a tube with a lengthwise gap throughout its side wall between two adjacent edges, and a liner of nylon covering the inner surface of said shell and forming flanges covering said adjacent edges inside said gap, the total thickness of both flanges being less than the width of said gap so as to leave a space between said flanges, said flanges being extended outwardly of said shell and connected by a relatively heavy nylon portion constituting the bottom of a channel having said flanges as its legs and being open towards the interior of said shell.

2. A bearing as in claim 1, said flange portions extending outwardly of said shell together with said relatively heavy nylon portion forming a lengthwise extending key-like projection of said bearing to locate the latter in a lengthwise grooved external housing.

References Cited in the file of this patent

UNITED STATES PATENTS

| | | | |
|---|---|---|---|
| 244,192 | Crandal | July 12, | 1881 |
| 2,215,523 | Haushalter | Sept. 24, | 1940 |
| 2,324,083 | Holmes | July 13, | 1943 |
| 2,666,677 | Miller | Jan. 19, | 1954 |
| 2,675,283 | Thomson | Apr. 13, | 1954 |
| 2,702,730 | Ivanoff | Feb. 22, | 1955 |
| 2,815,253 | Spriggs | Dec. 3, | 1957 |
| 2,835,540 | Jorgensen | May 20, | 1958 |
| 2,851,316 | Thomson | Sept. 9, | 1958 |
| 2,865,691 | Muller | Dec. 23, | 1958 |